United States Patent
Clauson et al.

(10) Patent No.: US 12,530,802 B2
(45) Date of Patent: Jan. 20, 2026

(54) AUTOMATED IMAGE ABERRATION IDENTIFICATION SYSTEM AND METHOD

(71) Applicant: RivalShot Corp., Atherton, CA (US)

(72) Inventors: Paul Clauson, Atherton, CA (US); Matthew Newell, Reno, NV (US); Max Lee, Bountiful, UT (US); Teja Veeramacheneni, Fremont, CA (US)

(73) Assignee: RivalShot Corp., Atherton, CA (US)

( * ) Notice: Subject to any disclaimer, the term of this patent is extended or adjusted under 35 U.S.C. 154(b) by 340 days.

(21) Appl. No.: 18/341,499

(22) Filed: Jun. 26, 2023

(65) Prior Publication Data

US 2025/0363667 A1 Nov. 27, 2025

Related U.S. Application Data

(63) Continuation-in-part of application No. 16/948,233, filed on Sep. 9, 2020, now Pat. No. 11,727,666.

(60) Provisional application No. 62/899,519, filed on Sep. 12, 2019.

(51) Int. Cl.
*G06T 7/90* (2017.01)
*G06T 7/33* (2017.01)
*G06T 7/73* (2017.01)

(52) U.S. Cl.
CPC ............... *G06T 7/90* (2017.01); *G06T 7/337* (2017.01); *G06T 7/74* (2017.01); *G06T 2207/10024* (2013.01); *G06T 2207/20084* (2013.01); *G06T 2207/30168* (2013.01)

(58) Field of Classification Search
CPC .. G06T 7/90; G06T 7/74; G06T 7/337; G06T 2207/10024; G06T 2207/20084; G06T 2207/30168
See application file for complete search history.

(56) References Cited

U.S. PATENT DOCUMENTS

| | | |
|---|---|---|
| 9,129,356 B2 | 9/2015 | Dougal |
| 2013/0108106 A1* | 5/2013 | Dougal ............... G06T 7/001 382/103 |
| 2015/0036878 A1 | 2/2015 | Nashizawa |
| | | (Continued) |

FOREIGN PATENT DOCUMENTS

CA   3066383 A1 *   7/2020   ............. G06T 7/269

OTHER PUBLICATIONS

Nov. 23, 21 USPTO Office Action (U.S. Appl. No. 16/948,233).
Mar. 14, 2023 USPTO Office Action (U.S. Appl. No. 16/948,233).

*Primary Examiner* — Pinalben Patel
(74) *Attorney, Agent, or Firm* — Forsgren Fisher; Daniel A. Tysver; James M. Urzedowski

(57) ABSTRACT

Aberrations on a surface, such as shots on a target, are identified through image processing techniques using color subtraction. An image of the surface is first initialized by shrinking the image and identifying pixel colors. A quantization algorithm is used to identify K number of colors, and acceptable variations for those colors are identified, and then stored in a color palette. Future images are analyzed by subtracting colors that match colors in the color palette. Remaining colors are aged in, and then compared with previously identified aberrations (shots). Image processing techniques then verify the potential aberrations. Data concerning verified aberrations are then displayed on remote user interfaces.

20 Claims, 9 Drawing Sheets

(56) References Cited

U.S. PATENT DOCUMENTS

2017/0370683 A1 12/2017 Ghani
2019/0186876 A1 6/2019 Howe

* cited by examiner

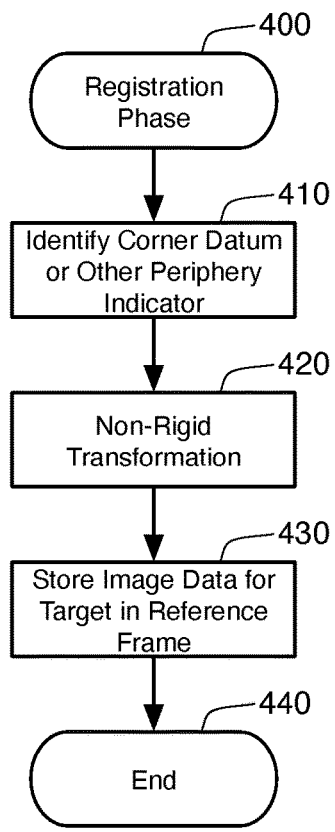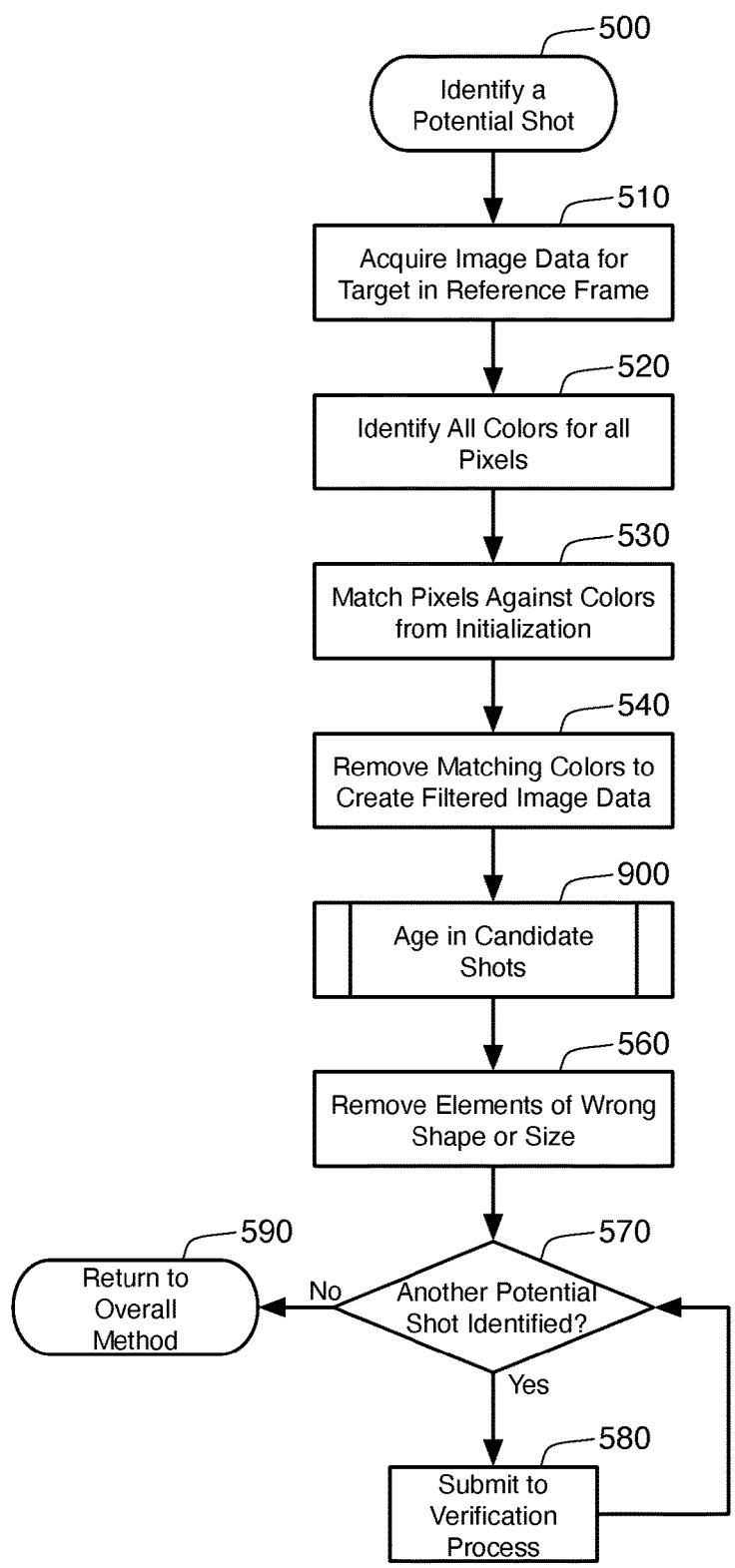

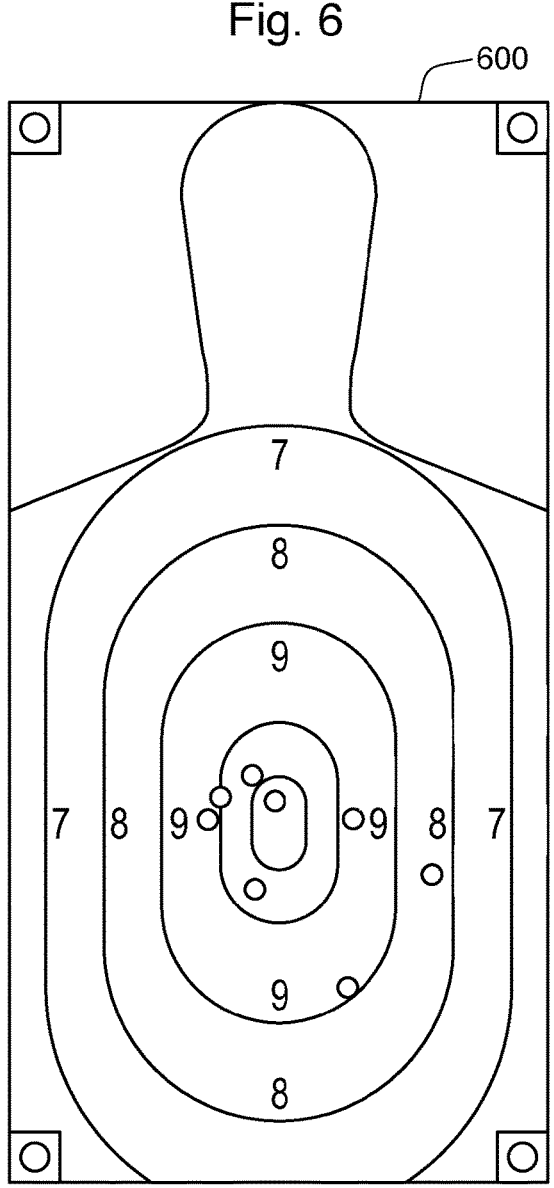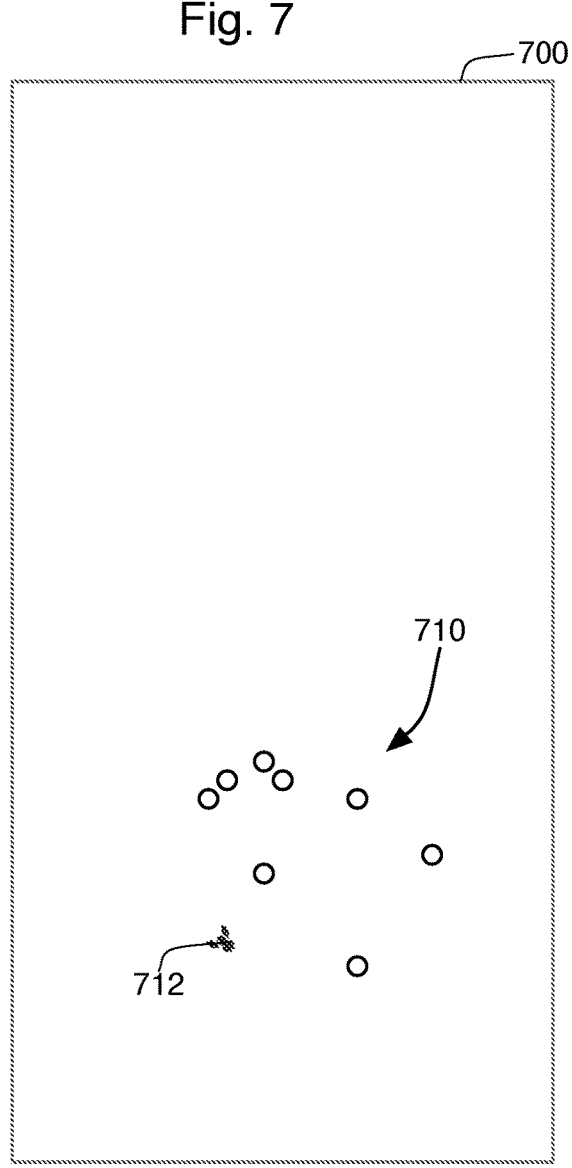

AUTOMATED IMAGE ABERRATION IDENTIFICATION SYSTEM AND METHOD

CROSS-REFERENCE TO RELATED CASES

This application is a continuation-in-part of U.S. patent application Ser. No. 16/948,233, filed on Sep. 9, 2020, which in turn claimed the benefit of U.S. Provisional Application Ser. No. 62/899,519, filed on Sep. 12, 2019, both of which are hereby incorporated by reference in their entireties.

TECHNICAL FIELD

This application relates to image element recognition and identification relating to aberrations on a stable background.

BACKGROUND

Target shooting is typically done by shooting with a projectile firing item, such as a gun, at targets. These targets can be made out of a variety of materials; most frequently from paper. The hitting of the target by the projectile causes a hole in the target, which is referred to herein as a shot on the target. These shots can be seen by the user in different ways. The location can be found using magnifying devices such as binoculars. Sometimes the targets are on pulleys and can be rolled back towards the shooter.

SUMMARY

The inventors recognized the desirability of a shooting target system and method that automatically identifies the location of shots on a target. The system allows the shooters to know their score by looking at their phone or tablet, without needing to view the target. This can be used when competing with other shooters.

The system and method as described can be used with any existing target range systems, as it is independent of target size and color.

Embodiments describe systems and methods that use an image acquisition device such as a camera to obtain images of the shooting target and use a processing device to compute the location of the shots on the target. In embodiments, the users can share both the real-time and historic details as part of a competition. Unlike other systems, users who are competing need not be in the same physical location.

The shots on the targets can be considered aberrations that appear on a surface. An image of the target is first initialized by shrinking the image and identifying pixel colors. A quantization algorithm is used to identify K number of colors, and acceptable variations for those colors are identified, and then stored in a color palette. Future images of the target are then analyzed to find potential shots (or other aberrations). Potential shots are found by subtracting colors in those future images that match colors found in the color palette. The pixels having colors that do not match the color palette are aged in, and then compared with previously identified shots. If one of the potential shots remains after being aged in, but does not match a previously identified shot, that potential shot is submitted for verification. Potential shots can be verified using a plurality of image recognition techniques. In some embodiments, a plurality of image recognition techniques are used, and if sufficient agreement exists the potential shot is verified. Data concerning verified shots are then displayed on remote user interfaces.

BRIEF DESCRIPTION OF THE DRAWINGS

FIG. 4 shows a flow chart of a registration process as part of the method of FIG. 1.

FIG. 5 shows a flow chart of a process for identifying a potential shot as part of the method of FIG. 1.

FIG. 6 shows a representation of registered image data.

FIG. 7 shows a representation of filtered image data.

DETAILED DESCRIPTION

System 10

Figure 1:
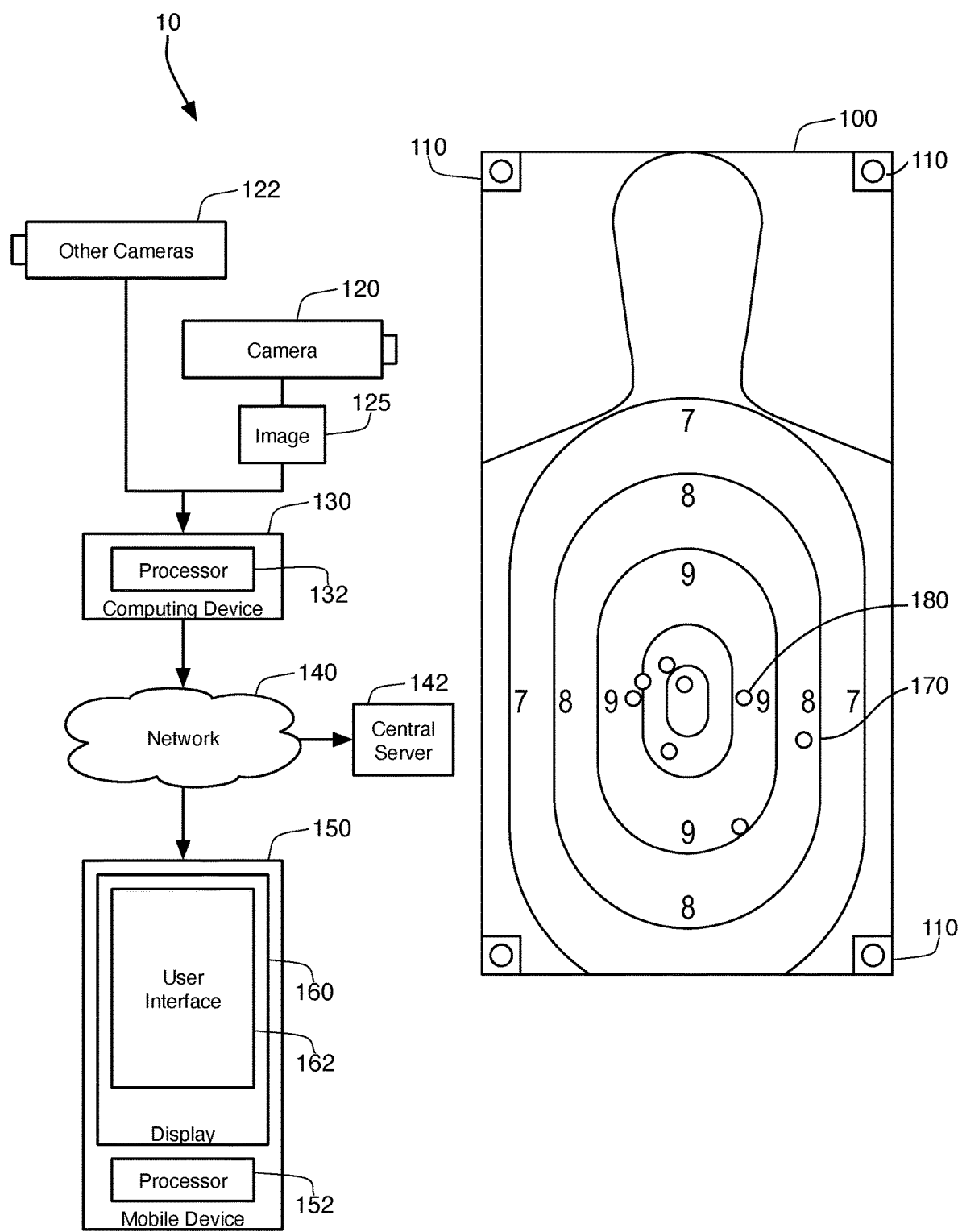
FIG. 1 shows a block diagram of a system used by one embodiment of the present invention.

FIG. 1 illustrates a system 10 for implementing one embodiment of the present invention. The system 10 includes a target 100, at least one camera 120 that creates a digital image 125 of the target 100, and a computing device 130 containing a processor 132 that analyzes the digital image 125. In this embodiment, the computing device 130 communicates with a mobile device 150 over a network 140. The mobile device 150 (also known as a user's personal device) has a processor 152 that analyzes the data and/or instructions provided over the network 140 in order to present information about the target 100 over a user interface 162 presented on a display 160.

The target 100 can be any kind, including a standard bullseye target, a human silhouette target, an animal target, and so on. In one embodiment, the target 100 is a paper target. As shown in FIG. 1, target 100 shows as a human silhouette and has datums 110 located at each of the four corners of the target 100. The four datums 110 are unique identifiers which can be of any form recognizable through digital image analysis. In this embodiment, the datums 110 are shown as squares having a round center at each of four corners of the target 100. By placing these datums 110 at the four corners of a rectilinear target 100, the computing device 130 can readily recognize the perimeter of the target.

In an alternate embodiment, the computing device 130 does not rely upon the datum 110 to determine the periphery of the target 100. Rather, the computing device 130 identifies a peripheral border around the target 100. For example, a target 100 might have a background of a known color or colors that extends across most of the target, with a border of a contrasting color (such as white) running along the periphery of the target 100. The computing device 130 can use the border color to identify the periphery of the target 100 using standard image identification techniques.

The target 100 may have score lines 170. In FIG. 1, the one score line 170 that is identified by figure number 170 is associated with a score of 8, as is made clear by the numeral 8 appearing on the target 100 close to score line 170. Other score lines 170 are similarly associated with a score of 7 and a score of 9. Generally, each score line 170 defines an interior, and shots that are identified as occurring on or within a score line 170 are granted at least the associated score. Since one score line 170 may appear entirely within another—for example, the one score line 170 for the score of 9 is entirely within the one score line 170 for the score of 8—a shot is granted the highest score defined by the score lines that encompass the shot.

FIG. 1 also shows a plurality of shots 180, only one of which is explicitly identified in FIG. 1 with figure number 180. Each of these shots 180 can be scored based upon the encompassing score line(s) 170. The shot 180 identified in FIG. 1 by the figure number would be given a score of 9 because it is inside the one score lines 170 associated with scores of 7, 8, and 9; and 9 is the highest of these values. In the embodiments explicitly described herein, these shots 180 will be considered to have been made by bullets fired by a gun at the target 100, although other types of shots that impact and alter a target 100 can also be used with system 10.

At least one camera 120 is positioned to be imaging the target 100. Other cameras 122 may also be part of the system 10, although the other cameras 122 may be aimed at, and be used for processing, other targets 100 (not shown in FIG. 1). The camera 120 images the target 100 throughout the operation of the system 10 during an active shooting session. As such, the camera 120 must be placed and positioned to provide a good image 125 of the target 100.

If the camera 120 has digital or optical zoom, the zoom setting should be used to generate a quality image 125 of the target 100 without risking the possibility that the target 100 will be positioned outside of, or will move out of, the imaging capabilities of the camera 120. For example, the target 100 may be positioned such that it may encounter wind that would move and/or vibrate the target. The system 10 is designed to handle and compensate for such movement, but the camera 120 should be positioned so that any expected movement does not pull the target 100 out of the imaging of the camera 120.

The computing device 130 receives images 125 of the target 100 from the camera 120, and then uses its processor 132 and associated programming to analyze the images 125. These images 125 may be a series of still images, or frames of a video stream generated by the camera 120 (both of which may be referred to herein as "images" or "frames"). The computing device 130 can be local to the camera 120 (and the other cameras 122), connected either through a wired connection or a local area network wireless connection. Alternatively, the computing device 130 can be located at a remote location. A remote computing device 130 could take the form of a centralized computer that handles multiple locations, where each location includes multiple targets 100 and multiple cameras 120, 122, with the remote computing device 130 processing the images 125 for each camera 120, 122 at each location.

After processing the images 125, the processor 132 will be able to identify shots 180 as they appear on the target 100 and associate the shots 180 with a location on the target 100. That location information can also be used to identify a score for each shot based on the location relative to the score lines 170. The programming on the processor 132 is able to identify each new shot 180 using the process described in more detail below. The location of the shot 180 relative to the target can also be easily determined using this technique. With this location information, it is a simple matter to program the processor 132 to assign a score value to the shot 180 based on the location relative to the score lines 170. The computing device 130 can also be programmed to send data to a mobile device 150 that is associated with a particular target 100 every time a new shot 180 appears on the target 100. This information can include the location, timing (including shot order number), and score for the shot 180.

The transmitted information is used by the processor 152 of the mobile device 150 to generate a user interface 162 on the display 160. In one embodiment, the user interface includes a representation of the target 100 with the different shots 180 thereon, also showing ordinal numbers for the recorded shots 180 as well as a total score for the shots 180.

In one embodiment, a local computing device 130 communicates with a central server 142 over the network 140. The network 140 in this case may incorporate a wide-area network such as the Internet. The central server 142 can accumulate all of the information generated by the computing device 130. This allows for a central storage, analysis, and reporting of data for a plurality of users. In some embodiments, the central server 142 can then report data back to the computing device 130 or the display 160 of the user to allow for live, competitive target matches between remote users or teams. In this manner, the user interface 162 of the mobile device 150 may show that user's shots and total score, as well as another, remote user's shots and total scores. Colors, for example, may be used to distinguish between the shots and score of the local user versus the shots and score of the remote user. The user interface 162 may utilize a web browser, with the interface 162 being presented as a webpage or website provided by a web server operating on the computing device 130 or the central server 142. Alternatively, an app could be developed that operates on the mobile device 150 that requests data from the computing device 130 or the central server 142, and then uses that data to create the user interface using the app's own programming.

Figure 12:
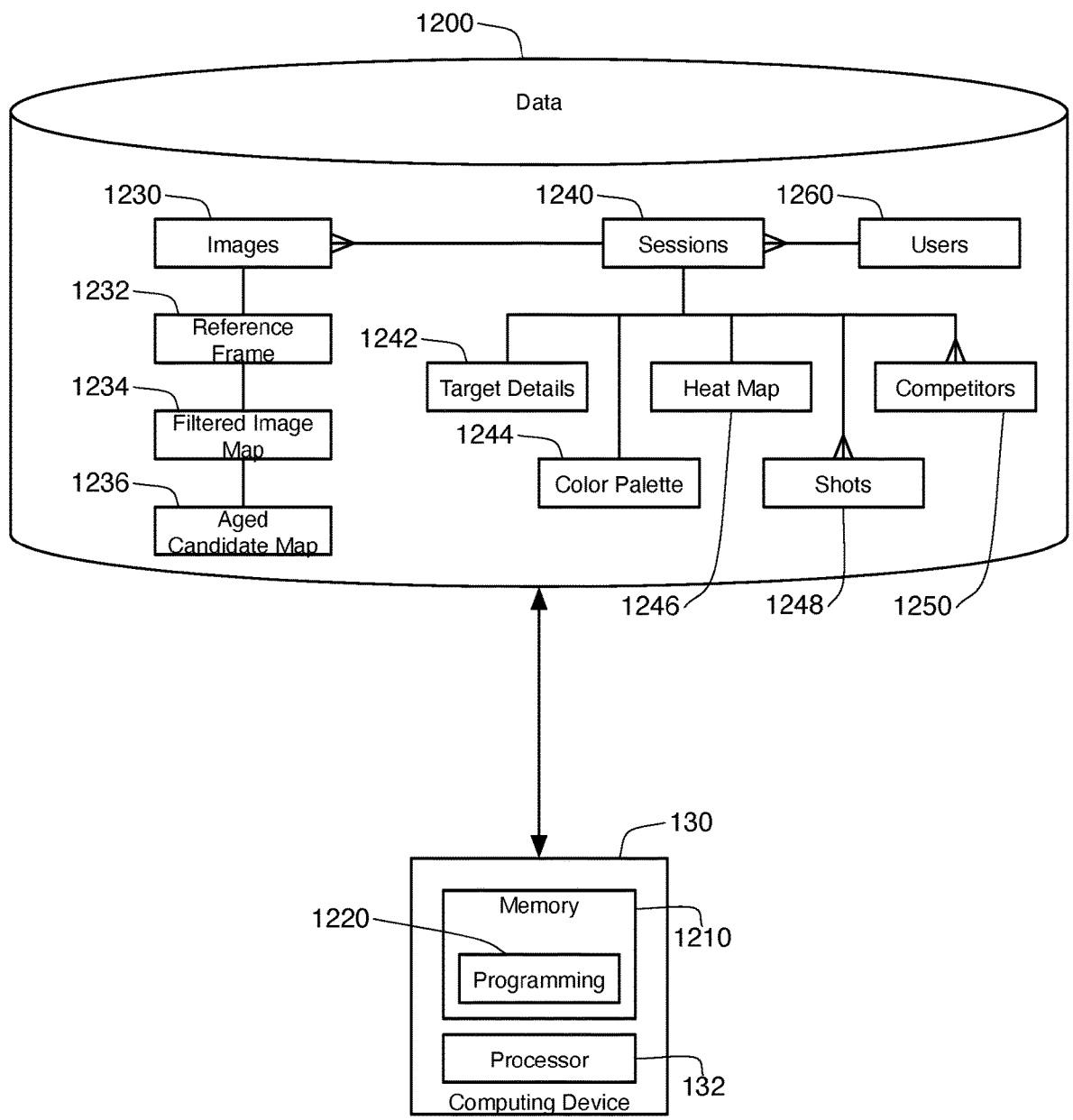
FIG. 12 is a schematic view of a computing device and related data as part of the system of FIG. 1.

The relationship between the computing device 130 and the data 1200 that it maintains is shown in FIG. 12. The computing device 130 is shown in that Figure having both a processor 132 and memory 1210. The processor 132 may be a CPU of the type used in standard computer systems, such as the CPU devices created by Intel Corporation (Santa Clara, CA), Advanced Micro Devices, Inc (Santa Clara, CA). Alternatively, the processor 130 may be a RISC processor of the type used in mobile devices, such as processors produced according to the designs of Arm Holdings PLC (Cambridge, England). The memory 1210 generally includes both temporary, random-access memory (RAM) and more permanent storage such as magnetic disk storage, FLASH memory, or another non-transitory (also referred to as permanent) storage medium. The temporary memory and storage (referred to collectively as "memory") contain both programming instructions 1220 that instruct the processor 132 to perform the steps described below.

The data 1200 includes image data 1230 relating to or containing the images 125 created by the camera 120. Data 1200 is also maintained about individual shooting sessions 1240 by users 1260 of the system 10. Each session 1240 will maintain data about the target 100 being used for that session in the target details 1242, which may include data about the overall configuration of the target 100 and the existence and locations of the score lines 170. Information about each shot 180 identified by the system 10 is stored in shot data 1248, as is information about local and remote competitors 1250 that may be competing with the user identified in user data 1260 during a shooting session 1240. Other data 1200 shown in FIG. 12 is described in more detail below.

The data 1200 itself can be stored locally to the computing device 130, or the data 1200 can be stored remotely and be accessed across the network 140. The data 1200 might be stored in a structured database, such as a relational database system or an object-oriented database. In a structured database, elements of data can be related (or "associated") with other data through that structure. A simplified representation of the relationship between data elements is shown in FIG. 12 in crow's-foot notation. FIG. 12 shows the data 1200 as different data elements, such as session data element 1240 and user data element 1260. These different elements can be separate objects or tables in a database system. However, there is no reason that the actual data 1200 used in system 10 be structured in the same manner, as data 1200 that are shown as different elements in FIG. 12 could be combined or separated in a different manner and still be consistent with the described embodiments.

Method 200

Figure 2:
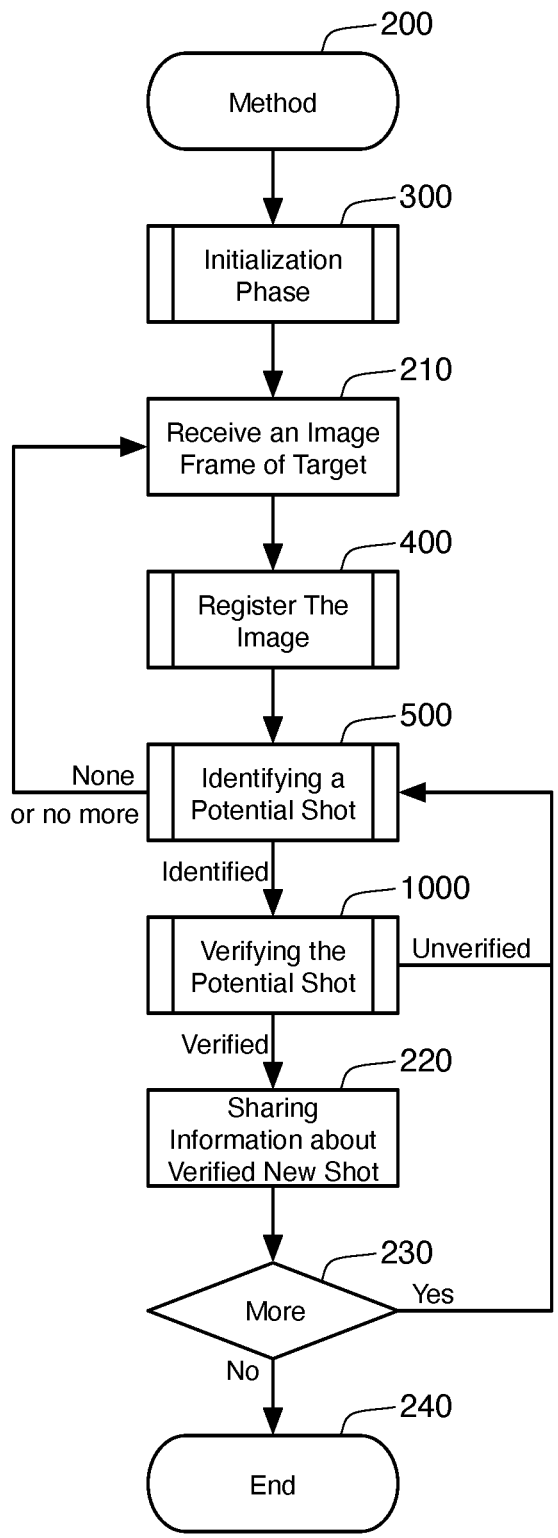
FIG. 2 shows a flow chart of an overall method used by the system of FIG. 1.

A computerized method 200 for identifying shot locations in a digital image using the system 10 is shown in the flow chart found on FIG. 2. The first step of overall method 200 is the initialization phase or process 300. The initialization process 300 is described in more detail below in connection with FIG. 3 and is responsible for identifying the base colors that are found on the target 100. Identifying the base colors is important as these colors are used to help identify a potential shot during process 500, described below. The hole formed by the shot 180 may allow the details/colors from the background behind the target to be visible. This background may be of a tremendous variety of colors, shades, and brightness. But it is unlikely that the color value of whatever is visible through the hole created by the shot 180 will match the colors that are printed on the target 100. Thus, the initialization process 300 is performed to identify the colors printed on the target 100. Because light may be shining on a target, or the target may be in shade, or a colored light may exist nearby the target, it is not sufficient to have information about the colors printed on the target. Consequently, this step will identify the color information about the target 100 in the environment in which it is being used by system 10. This information is stored as the color palette 1244 for the session 1240 in data 1200.

After the initialization process 300, the overall method 200 will receive an image 125 of the target 100 taken by the camera 120. This image 125 can be a single shot image or a single frame in a video stream created by the camera 120. This image 125 is stored in image data 1230.

The image 125 is processed by the registration process 400, which is responsible for registering the image and is described in detail in connection with FIG. 4 below. The registration process 400 is responsible for converting the representation of the target 100 found in the image 125 (received at step 210) into a reference frame 1232. Because it is known that the physical target 100 may be installed in slightly different positions and may move with respect to the camera 120 during an active shooting session, it cannot be expected that the same position on the target 100 that appears at a specific pixel position on the camera image 125 at a first time will remain at the same pixel position at a later time. However, different images 125 showing the target 100 taken at different times are to be compared. Thus, each image 125 is converted into a reference frame 1232 where the same position on the target 100 is to be found at the same approximal pixel position in the reference frame. As is explained in further detail below, the datum 110 found on the corners of the target 100 (or the border or other periphery identifications) are used in a non-rigid transformation to align the target in the camera image 125 into this reference frame 1232.

Next, the potential shot identification process 500 identifies a potential shot 180 based on the reference frame 1232 received from the registration process 400. A potential shot can be seen as a portion of a reference frame that contains a color not identified in the initialization phase. Thus, the colors found in the color palette 1244 are removed from the reference frame 1232, resulting in a filtered image map 1234 (also known as a color-agnostic frame). The filtered image map 1234 identifies portions of the reference frame 1232 having colors not found in the color palette 1244. In other words, the relevant pixels (those that made it through the color palette filter) of the filtered image map 1234 indicate that something different has occurred at this part of the target 100. While these different portions might identify locations of shots 180 on the target 100, differences might also be something transitory, such as a moving shadow or a fly that landed on the target 100. Thus, the portion of different color that represents shots 180 should be visible for some duration in time, such as two seconds. As explained below, this process of ignoring transitory differences can be accomplished through an aging process using heat map 1246.

If a stable area of different color is identified by potential shot identification process 500, it is submitted to a verification process 1000 for verification as an actual new shot 180 on the target 100. A center or centroid for that potential shot is identified, as well as its overall area and dimensions, its average color and color variations, and the arc lengths that are associated with it. The determined data for the portion is then fed into one or more analysis mechanisms in order to verify it as a new shot. These mechanisms may include machine learning algorithms such as neural networks. Hardcoded, rule-based algorithms can also be used to identify a shot 180.

Either the potential shot identification process 500 or the verification process 1000 should reject identified potential shots that have already been identified as a verified shot 180 on the target 100. In one embodiment, the pixel location of the centroid for the potential shot is compared to the centroid locations of previously identified shots (found in data element 1248). If the centroid of the identified portion is considered near enough to the centroid location of a previously identified shot (within a certain number of pixels, for instance), the identified portion will not be further analyzed as it can be considered to comprise the previously verified shot.

If the verification process 1000 rejects an identified portion, the overall method 200 returns to the potential shot identification process 500 for further analysis of the registered image. If additional portions are identified, these will be submitted to the verification process 1000. If not, the overall method 200 returns to step 210, and another image 125 from the camera 120 is received.

If the verification process 1000 verifies the identified portion as a new shot, this is recorded as a new shot in shots data element 1248. This information is also shared across the network 140 with the mobile device 150 and, in some cases, with central server 142. This sharing of information occurs at step 220. The mobile device 150 can then use this information for the generation of a user interface 162 on the display 160. The central server 142 can also store this information and/or distribute it to other locations to allow for simultaneous target competitions occurring across multiple physical locations simultaneously.

In most cases, the overall method 200 will then return to potential shot identification process 500 to examine the registered image for more potential portions or to begin examination of a new image 125. In some cases, however, step 230 will determine that the overall method 200 is completed, and the method 200 will end at step 240.

Initialization Process 300

Figure 3:
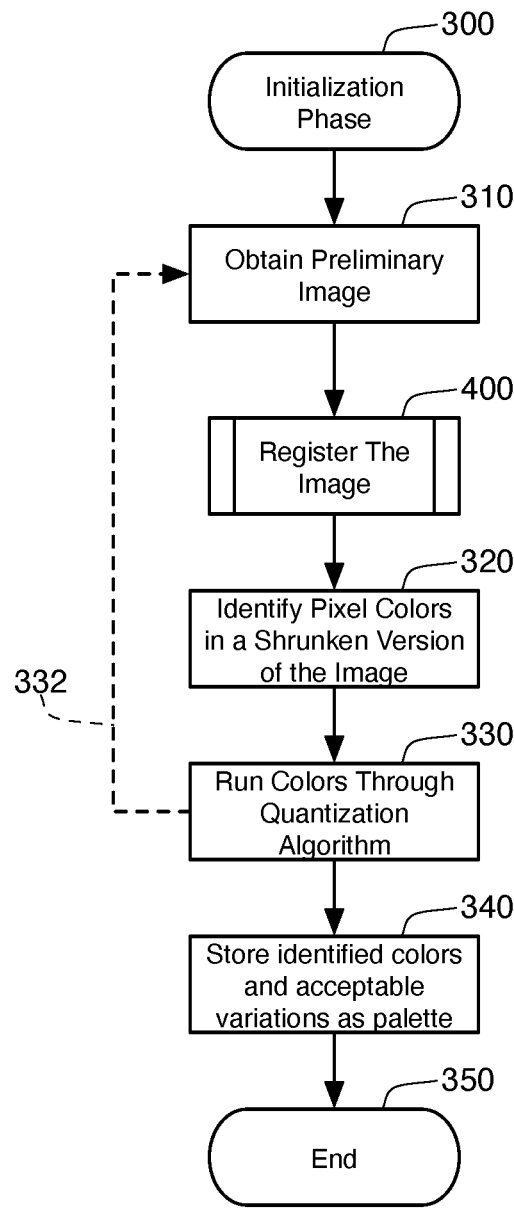
FIG. 3 shows a flow chart of an initialization process as part of the method of FIG. 1.

The initialization process 300 is shown in the flowchart of FIG. 3. As explained above, this initialization process 300 determines the base colors that are found on the unshot target 100 and stores this information in a color palette for the target 100. The color palette is usually represented as a vector or list of pixel color values. The initialization process 300 should be performed on a fresh target 100 that does not contain any shots 180 or other holes.

The process 300 begins at step 310, where a preliminary image 125 (that has not been shot) is received from the camera 120. Next, the registration process 400 is utilized to create a reference frame for the target 100 based on the received image. This is accomplished so that the remaining steps in the initialization process 300 are performed on the colors found in the target 100 and not on any background colors in the image 125 unrelated to the target 100. The details of this registration process 400 are described below in connection with FIG. 4.

At step 320, the colors of the pixels in that registered image are identified. In one embodiment, a shrunken version of the registered image is utilized for this step 320. For example, the registered image could be reduced by a set ratio ranging from 75% to 25%. One benefit of shrinking the image is that it reduces the number of pixels that must be analyzed, which increases the speed at which the remaining steps in the initialization process 300 can be accomplished. A second benefit is that the shrinkage also eliminates some of the minor color variations in the target 100 that might occur due to crinkles or lighting irregularities. If four pixels, for example, are reduced to a single pixel as a result of the shrinking, the process will replace the separate color values in the four pixels with a single pixel having a single color. The amount of shrinkage could vary upon the use case and the processing speed of the computing device 130.

The identified colors are then run through a quantization algorithm at step 330. An example quantization algorithm is the K-means algorithm, although other techniques are also possible (such as a similar K-means-like algorithm). The K-means algorithm is designed to identify clusters in data. A set number of colors to be found (the "K" in the algorithm) can be provided to the algorithm, such as six colors. The algorithm then identifies the centroid of K clusters of color values. These clusters, defined in a color space such as (R,G,B), are then used to identify the K number of colors primarily found on the target 100. An acceptable variation is also defined so that found colors that are close to one of the identified colors will be considered to be that color by the later processing steps. These acceptable variations can be uniform (for example, within 3 data points in a 0-255 scale for each of the R, G, and B color indexes). Alternatively, the acceptable variations can be set separately for each color based on the results of the step 340 analysis. For example, if the K-means algorithm analysis determines that one cluster has a larger deviation or spread in the data points for the cluster of a particular color, the acceptable variation in that color can be larger than for other colors.

In some embodiments, multiple images 125 of the target 100 are gathered over time (see dotted arrow 332) and separately analyzed by steps 400, 320, 330. Re-doing these steps at different points of time should capture variations in the primary colors due to changes in lighting on the target. In effect, before the overall method 200 begins analyzing actual shot data in the images 125, a first subset of these images 125 before any shots is analyzed to determine the base colors for the target 100.

At step 340, the identified base colors are stored in memory by the computing device 130 as the target color palette 1244 for later use in the potential shot identification process 500, as described below. Acceptable variations in the colors are also stored. When multiple images are analyzed (through dotted arrow 332), the color palette 1244 reflects the result of analyzing these multiple images. If the colors identified in the separate images 125 overlap each other (are within acceptable variations), then they are considered the same color. The acceptable variation stored in step 340 may be based on the experience of reviewing the multiple images 125. If the colors match exactly, then the acceptable variation that is stored can be relatively small. If the colors barely overlap, the computing device 130 can expand the acceptable variation for that color. In one embodiment, the entire range of acceptable variations for the colors that are determined to be the same is used to set the acceptable variation saved as the color palette in step 340. For instance, if two images 125 each share a color determined to be the same, where the first image 125 has a variation for that color in the red portion between a value of 133 and 140, while a second image 125 has a variation for that color in the red portion between a value of 128 and 134, the new variation in the red portion for that color in the color palette can be set to 128 (the lowest value of all examples of that color) to 140 (the highest value). The method then ends at step 350.

Registration Process 400

The registration process 400, shown in FIG. 4, transforms an image 125 showing the target 100 and background elements into a standardized reference frame 1232 showing just the target 100. The first step 410 is to examine the image 125 and identify indicators showing the periphery of the target 100. Since most targets 100 are rectilinear, generally all that is necessary in step 410 is to identify the four corners of the target. In the embodiment shown in FIG. 1, the target 100 has datum 110 in each corner, with each datum 110 comprising a square containing a circle. These datum 110 are easy to recognize in an image 125 using standard image recognition techniques. Other datum 110 are possible, and these datum 110 would preferably also be defined as elements that are easily recognizable through computerized techniques.

In other embodiments, no datum 110 are found at the corners of the target 100. Rather, a border of a different color defines a perimeter of the target 100. The border may be printed (such as a black border), or it may be defined as a lack of printed ink that allows the color of the paper stock (such as a white border if the stock were white) to define the border. Preferably, all portions of the border would be visible in the image 125 being registered. In one embodiment, the identification of the perimeter is used to identify the four corners of a rectilinear target 100.

Once the periphery is identified in step 410, a non-rigid transformation is used at step 420 to transform the pixels of the target 100 found in the image 125 into a common reference frame. Such a transformation can adjust for size differences of the target 100 in different images 125, as well as any skew or rotation of the target 100 in different images 125. If the target has, for instance, a 3×1 height to width ratio, the common reference frame could have the same ratio (such as 1500 pixels×500 pixels). The image data resulting from this transformation is then stored as the reference frame 1232 for this target image at step 430. The process 400 then ends at step 440.

When multiple images 125 are registered in this way, the representation of the targets 100 in the created common reference frames 1232 will be consistent regardless of variations on size, rotation, or skew that might have been found in the original images 125. Thus, the same portions of the target 100 will be found at the same pixel locations in the common reference frames 1232 across multiple images.

While the above description relates to a rectilinear target, it would be possible to also register a target 100 having a different shape using this same registration process 400. The periphery of a circular target 100, for instance, could be identified and transformed in the same manner. Of course, some indicator would have to be found on the circular target 100 to identify one part of the circle as unique in order to consistently account for rotation of the target 100. For example, an indicator might be recognized that indicates the top or bottom of the target 100.

Potential Shot Identification Process 500

The potential shot identification process 500 is shown in the flow chart of FIG. 5. The first step 510 in this process 500 is to acquire the image data 1230 for the target that has been transformed into the reference frame 1232 by registration process 400. An example 600 of this reference frame image data 1232 is shown in FIG. 6 that shows the target 100 shown in FIG. 1. The next step 520 identifies the colors for the pixels found in that reference frame image data 1232, and then step 530 determines which pixels have a color that matches one of the target colors stored in the color palette 1244. This match is determined to within the acceptable variations of those colors. At step 540, all colors in the registered image data 600 that match the target colors are removed from the image data, leaving filtered image map data 1234, an example 700 of which is shown in FIG. 7.

In other words, the colors found on the target 100 are identified in the initialization process 300, and these colors are subtracted from the registered image data 600. The result is that only the remaining colors are used to create the filtered image data 700. By using the initialization process 300 to identify the target colors for the color palette 1244, the overall method is color agnostic. Any target design featuring any color can be analyzed in this manner.

The filtered image data 700 contains those pixels that have a different color than the background colors in the color palette 1244. In effect, the filtered image data 700 creates a map of "candidate" shots, which are items which are likely to represent shots 180. Thus, filtered image data 700 can also be referred to as the filtered image map 700. As can be seen, most of the remaining elements seen in the filtered image data 700 do directly correspond to the shots 180 shown in FIG. 1. However, this filtered image data also shows that a fly landed on the target 100 on this time, thus the filtered data 700 also contains a portion 712 that relates to the image of the fly on the target 100.

To avoid issues with these types of temporary variations in the images 125, an aging-in process 900 is preferably initiated that uses a heat map 1246. The purpose of the heat map 1246 is to ensure that no candidate shots are identified as a potential shot until they have aged in for a period of time. In its most simplistic implementation, the aging-in process 900 ensures that a candidate shot 710 remain in the same location over multiple image frames that were received at step 210. Thus, if this were the first image, no candidate shots 710 would age in since there could be no verification of the candidate shots 710 against prior images 125.

Figure 8:
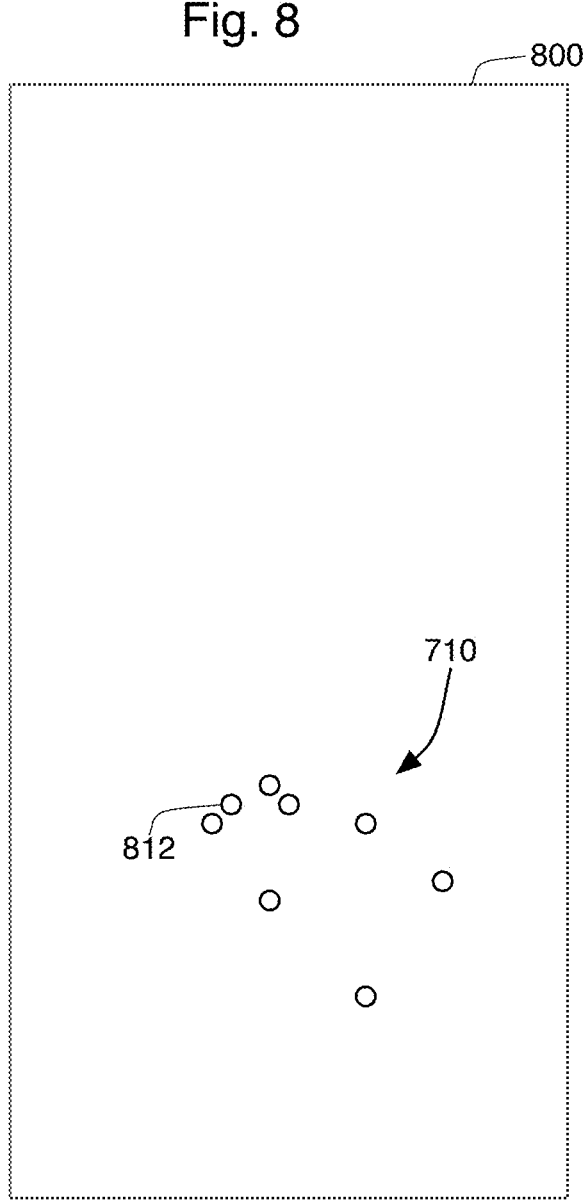
FIG. 8 shows a representation of an aged candidate shot map.
Figure 9:
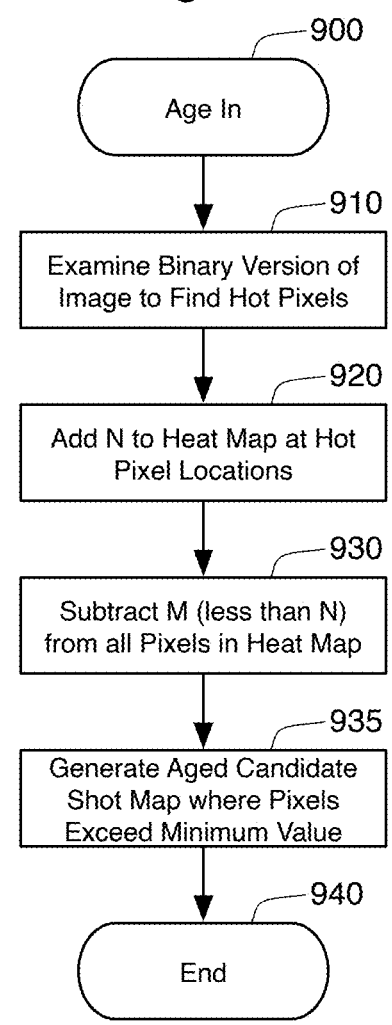
FIG. 9 shows a flow chart of an age-in process as part of the process of FIG. 5.

While different variations of the aging-in process 900 are possible, FIG. 9 shows one embodiment of such a process 900. This process 900 starts with step 910, in which the filtered data map 700 is examined as binary pixels (either on or off), with all color being removed. This simplification of the filtered image data 700 makes it easier to identify candidate shots 710 and simplifies the aging process 900. Next, at step 920, the locations of the hot (on) pixels are then added to a heat map 1246. A heat map 1246 might be implemented in a 2-D matrix having the same dimensions as the pixel size of the filtered image data 700. The hot pixels are added to the heat map 1246 by adding a pre-established number N to a value stored at each location corresponding to a hot pixel. At step 930, a second established number M is subtracted from the value at every location on the heat map 1246. The number M is less than the number N, such that over time a hot pixel that remains hot will keep increasing in value in the heat map 1246. In other words, that location will "heat up." A hot pixel that is hot only for a limited number of frames will eventually cool down. In one embodiment, the number M is only subtracted from values in the heat map 1246 having a positive value. In other embodiments, the heat map values never reduce below zero. In yet another embodiment, the zero value locations in the heat map 1246 are not stored or retained in memory, and the heat map 1246 simply lists pixel locations having a positive value. At step 935, the heat map 1246 is analyzed to determine all pixel locations that have a value that exceeds a minimum threshold value. These pixel locations are then used to generate an aged candidate shot map 1236, an example 800 of which is shown in FIG. 8. The method then completes at step 940.

Note that the above description assumes that the numbers M and N and the threshold value are positive numbers (M is 5, N is 3, and the threshold is 20). The same result is achieved with adding negative numbers (M is −5, N is −3, and the threshold is −20) as long as N has a lower magnitude than M, and the magnitude of the heat map value is compared to the magnitude of the threshold.

The heatmap aging-in process 900 acts as a noise filter. In a stream of video frames 125, there will always be frame-over-frame variations in color, brightness, and positioning of objects on the images 125. These phenomena introduce "noise" into the shot detection algorithm, potentially creating spurious classifications, and creating additional overhead for the shot verification process 1000 if not removed before that process 1000 begins.

Returning to potential shot identification process 500 on FIG. 5, step 560 will next remove false positive elements. These comprise any identified elements in the aged candidate shot map 800 that are clearly the wrong size (too large or too small) or of the wrong shape to be properly classified as a shot 180. For example, the inner-outline of a candidate shot's region can be evaluated on its arc-length and circularity, total pixel area, the ratio dimensions of its bounding box, and other quickly derived features which have been predetermined through statistical analysis of similar shots. Depending on the use case and computing capacity of the verification process 1000, this step may also be omitted.

The remaining potential shots in the aged candidate shot map 800 are then presented to the verification process 1000 as an identified potential shot. In FIG. 5, this is shown in step 570, which selects the next potential shot from the aged candidate shot map 800, and step 580, which submits an identified potential shot to verification process 1000. When all the identified potential shots have been submitted, processing returns at step 590 to the overall method 200 at step 210. This can also be seen in FIG. 2.

Verify Potential Shot (Send to Identification Algorithms)

Figure 10:
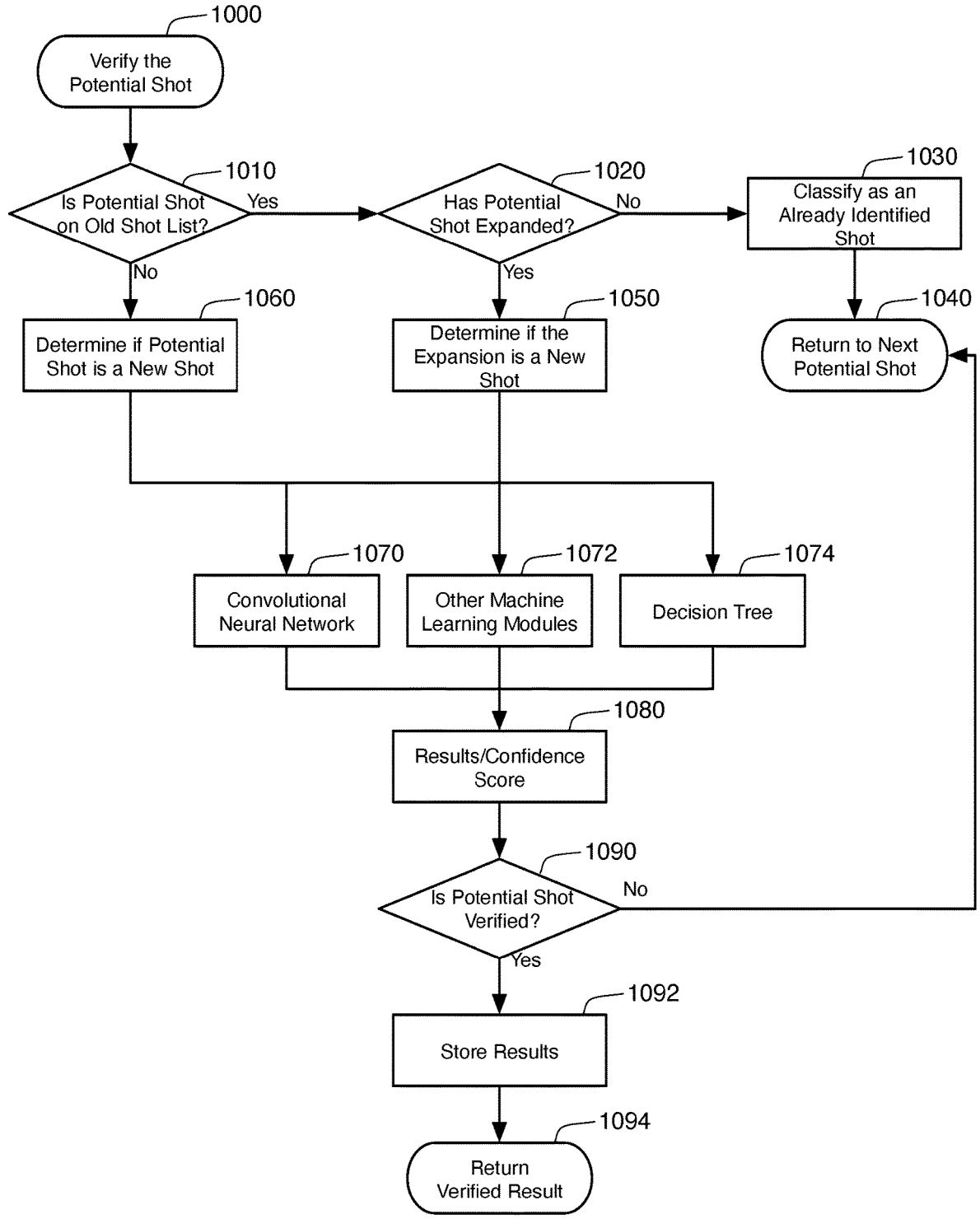
FIG. 10 shows a flow chart of a process for verifying a potential shot as part of the method of FIG. 1.
Figure 11:
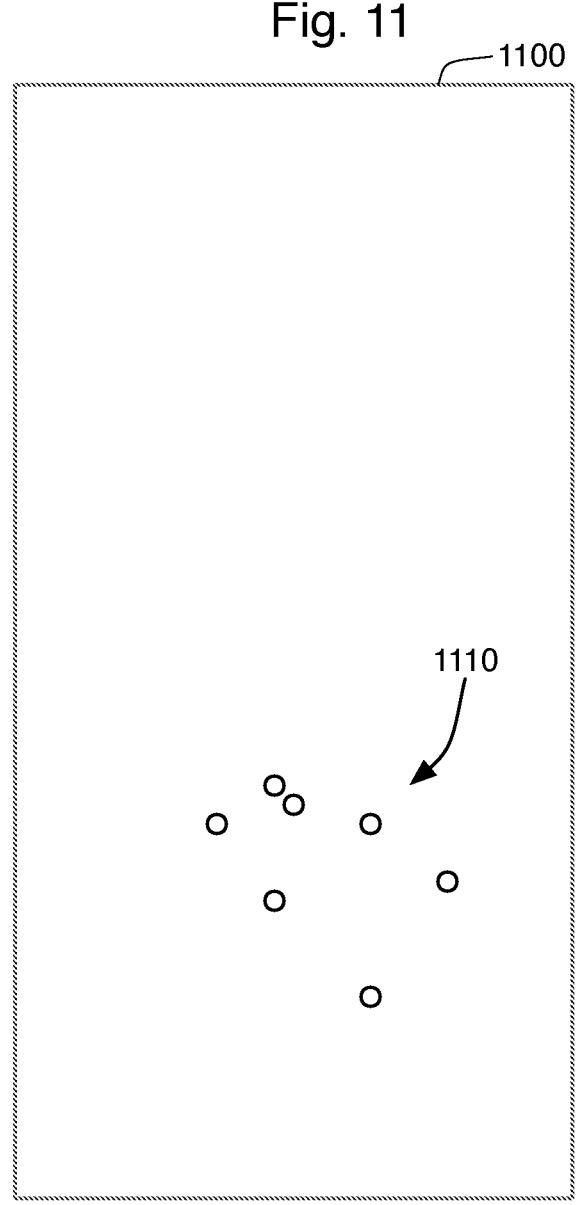
FIG. 11 shows a representation of a prior shot map.

The verify potential shot process 1000 is shown in the flow chart of FIG. 10. This process 1000 receives a single potential shot (or candidate shot) to be processed from the potential shot identification process 500. The first step 1010 is to check if the potential shot is close to any other shots that have already been verified. This requires that data 1248 from previously verified shots 180 be analyzed. An example 1100 of this shot data 1248 is shown in FIG. 11. If the identified potential shot received from the potential shot identification process 500 is close to one of the shots 180 in the prior shot map 1110, it will generally be ignored as a previously verified shot. The one exception is if the area of the matching shot has expanded since it was previously identified. In this case, another shot 180 may still have been recorded in which the hole from the second shot 180 overlaps a pre-existing shot hole. Step 1020 determines if the area of the matching shot has expanded. If not, this candidate shot is classified at 1030 as an already identified shot. The verification process 1000 then terminates at 1040, and the overall method 200 returns to step 570.

If the area of the matching shot has expanded, then this potential shot is processed at 1050 to determine whether it is a new shot that is close to an existing shot. Similarly, if step 1010 determines that the potential shot is not close enough to any previously identified shots in prior shot map 1100, step 1060 determines if the candidate is, in fact, a verified shot 180. In the Figures, location 812 has been added to the resulting aged candidate shot map 800, but there is not a corresponding, pre-existing verified shot 180 found in the prior shot map 1100. This location 812 would therefore be identified as a potential shot 180 and be submitted to the analysis of step 1060.

The techniques used to make the determinations at step 1050 and step 1060 are varied, and a variety of techniques 1070, 1072, 1074 are shown in FIG. 10 for making these determinations. FIG. 10 shows these differing techniques 1070, 1072, 1074 running in parallel, and step 1080 uses the results of these combined techniques 1070, 1072, 1074 to make an overall determination as to whether the potential shot should be verified as an actual shot and be stored in shot data 1248. In one embodiment, step 1080 uses a quorum of determinations to determine whether to verify a potential shot. In other embodiments, only one of the shown techniques are applied and that technique alone performs this determination and verification. In other embodiments, the results of the analysis from the various techniques 1070, 1072, 1074 are weighted both on the accuracy of the technique 1070, 1072, 1074 and the confidence score of each result from the techniques 1070, 1072, 1074.

The first technique 1070 is an artificial neural network that has been trained for image recognition based on images of known shots 180. The training of a neural network 1070 for image recognition is generally well-known. With a large enough training set and sufficient training, the neural network 1070 should be able to distinguish between actual shots 180 from the image 125 and similar looking anomalies. The neural network 1070 can be a convolutional neural network (or CNN), utilizing many thousands (or millions) of parameters that pass through convolutional and pooling layers. The object detection based neural network 1070 can be trained from scratch or using a technique called knowledge distillation, in which the model can be trained from the outputs of another machine learning model that is more accurate, but slower.

The second technique 1072 is a Bayesian neural network. A Bayesian neural network is a type of CNN, but it differs from a standard CNN on the weights that are assigned during training. A typical CNN uses a fixed set of weights to make it classification decision. A Bayesian CNN represents the weights as probability distributions instead of fixed values. Of course, other types of neural networks could be used as well (such as a spiking neural network), or even other types of computational neuroscience based on neuron modeling (such as artificial neocortical neuron modelling or the hierarchical temporal memory techniques).

The third technique 1074 uses input characteristic analysis and a hard-coded decision tree. Rather than directly analyzing images through image recognition and neural networks, potential shot characteristics are extracted about each potential shot, such as circularity, dimensions, area, and arc length, and latitude/longitudinal deltas. This information is fed into a decision tree to determine whether the potential shot should be validated as a shot as part of steps 1050, 1060. Such a decision tree might determine whether the shot area, arc length, and dimensions are within some pre-established threshold.

The result or overall confidence score from step 1080 is then analyzed to determine if the potential shot has been verified at step 1090. If not, processing will return to potential shot identification process 500 through step 1040. If so, data concerning this verified shot is then stored in shot data 1248 at step 1092. The data stored includes the location of the verified shot. This location can be specified with respect to the registered image data 600, as the locations on the actual, physical target 100 should map directly to pixel location in the registered image data 600. Timing information about the verified shot, such as the date and time that the shot was verified by verification process 1000 can also be stored in the shot data 1248. Finally, the verification process 1000 ends at step 1094, which returns the verified result to the overall method 200 and step 220. At step 220, the overall method 200 shares information about the verified shot with the mobile device 150 and/or the central server 142. As explained above, the mobile device 150 can then take this information to present a user interface 162 on its display 160. This user interface 162 can show a representation of the target 100, and the location of the verified shots, timing information about the shots (such as the order in which the shots were created/verified), and the score for individual verified shots and/or the overall score. Step 230 determines that the overall method 200 should continue, and then ensures that any additional potential shots in the aged candidate shot map 800 are identified and shared with the verification process 1000. If step 230 determines that the overall method 200 should terminate, the method ends at step 240.

Additional Alternatives

Figure 13:
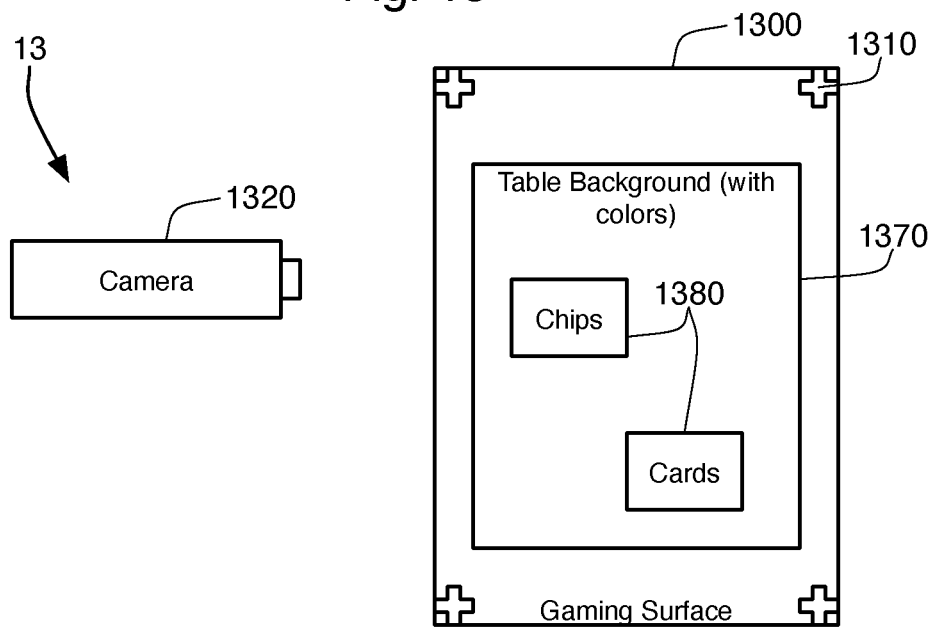
FIG. 13 is a partial block diagram of another embodiment of the present invention for use with images of a gaming table.

FIG. 13 shows an alternative embodiment system 13 wherein a camera 1320 takes images 125 (not shown in FIG. 13) of a gaming surface 1300. The images 125 acquired by the camera 1320 can be analyzed by a computing device 130 (also not shown) using methods similar to the methods described above. However, instead of identifying shots 180 on a target 100, system 13 identifies different types of aberrations 1380 on the gaming surface 1300. The gaming surface 1300 might be, for example, a gaming table for poker, for baccarat, for roulette, etc. The gaming surface 1300 can be registered by identifying a perimeter of the surface 1300, which can be accomplished, for example, using the registration phase 400 described above. The surface 1300 could even include datum 1310 at the corners of the surface 1300, such as the plus or cross symbols shown in FIG. 13.

The system 13 is designed to detect the presence of new aberrations 1380 on a gaming surface 1300, which might be, for example, betting chips or cards. These aberrations 1380 are preferably of a different color than the table or surface background 1370. In this environment, the images 125 produced by the camera 1320 can be initialized through process 300 to identify a palette for the table background 1370. Afterwards, each frame could be registered through process 400 (if movement of the surface 1300 or the camera 1320 is a possibility), potential new aberrations (cards or chips) could be identified and aged-in through process 500, and then these potential new aberrations can be verified through process 1000. Obviously, process 1000 would be altered to include different techniques 1070, 1072, 1074 designed to identify the different types of aberrations that might appear on the surface 1300 (such as cards or betting chips). However, the initialization process 300 and the identification of potential aberrations through process 500 could be implemented with no or only minor alterations.

Figure 14:
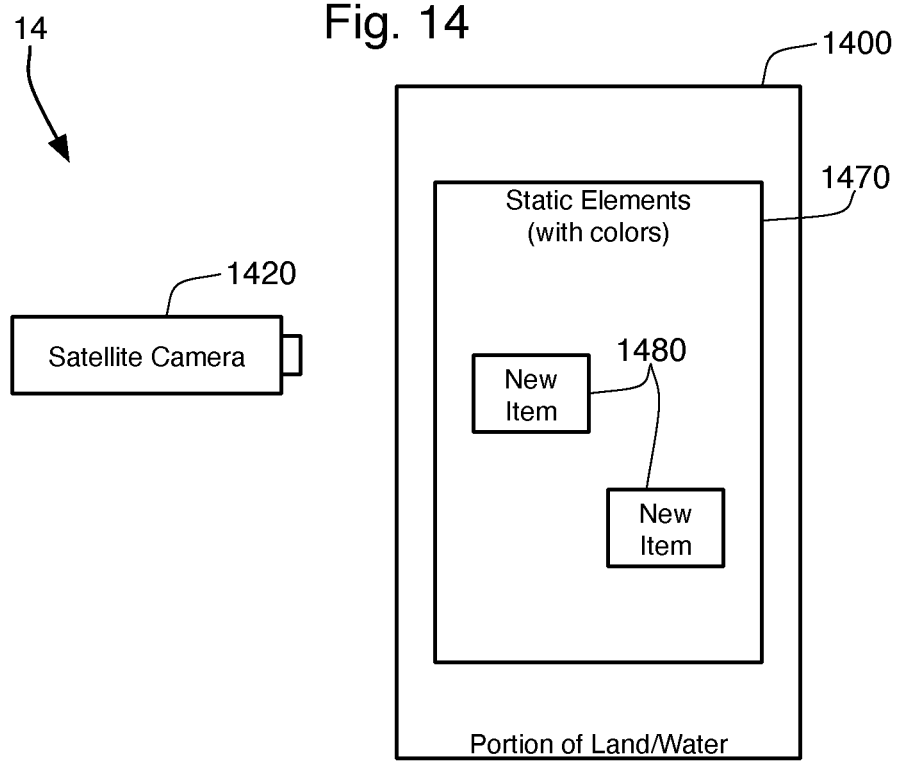
FIG. 14 is a partial block diagram of yet another embodiment of the present invention for use with satellite images of land or water.

FIG. 14 shows yet another alternative embodiment system 14. In this system 14, a satellite camera 1420 is used to image a portion 1400 of land and/or water. The portion 1400 can also be considered a surface, just like the gaming surface 1300 or the target 100 described above. In one embodiment, the portion 1400 could be a parking lot, or a field, or a shipping harbor. The portion 1400 can be identified by identifying the perimeter of the portion 1400 in a manner similar to the way that the perimeter of the target 100 was determined. In other embodiments, the perimeter is identified through color variations, or is manually identified using human verification techniques. The color palette of the static elements 1470 in the portion 1400 are next identified through the initialization process 300 described above. These static elements might be, for instance, the pavement of the parking lot, markings on the parking lot, or hardscape or landscaping elements on the parking lot. Next, potential new items 1480 on the viewed portion 1400 (such as ships in a harbor, or cars in a parking lot) can be identified through potential identification process 500 by identifying elements having different colors than those found in the color palette of the static elements 1470. These can be aged in as described above, and then a customized verification process 1000 could be used to identify and label the new items 1480 that are detected by the satellite camera 1420. In other words, system 13 and system 14 reveal that the basic elements of the overall method 200 can be applied in contexts other than the identification of shots 180 in a target 100.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computerized method of target shot identifying in image data, comprising:
    a) receiving image frames of an area including a target;
    b) initializing the target by identifying a plurality of colors found on the target in a first subset of the image frames, and saving the plurality of colors as a palette of existing colors;
    c) registering the target by identifying a perimeter from a first image and using a non-rigid transformation to align the target to a reference frame;
    d) identifying a potential shot in an analyzed frame by subtracting colors from the analyzed frame that are in the palette of existing colors to form a filtered image map;
    e) verifying that the potential shot by:
        i) comparing the potential shot to known shots to determine whether the potential shot is one of the known shots, and
        ii) when the potential shot is not a known shot, submitting a size and a shape for the potential shot for analysis to verify the potential shot as a verified shot; and
    f) storing data concerning the verified shot, including a location of the verified shot and a timing for the verified shot.

2. The computerized method of claim 1, further comprising:
    g) sending information indicative of the verified shot to a mobile device for presentation on a user interface.

3. The computerized method of claim 1, wherein step b) further comprises:
    i) receiving a preliminary image of the target prior to any shots,
    ii) registering the target in the preliminary image to align the target to a preliminary image reference frame,
    iii) identifying the colors in the preliminary image reference frame,
    iv) running the colors through a quantization algorithm to identify a limited set of colors, and
    v) storing the limited set of colors as the palette of existing colors.

4. The computerized method of claim 3, wherein acceptable variations are stored along with each of the limited set of colors, further wherein subtracting colors from the analyzed frame that are in the palette of existing colors compares the colors in the analyzed frame against the palette of existing colors based on the acceptable variations.

5. The computerized method of claim 4, wherein the acceptable variations are uniform for all the colors in the palette of existing colors.

6. The computerized method of claim 4, wherein the acceptable variations differ between the colors in the palette of existing colors based upon results of the quantization algorithm.

7. The computerized method of claim 4, wherein a plurality of preliminary images is analyzed to identify the plurality of colors found on the target.

8. The computerized method of claim 7, wherein the acceptable variations are stored along with each of the limited set of colors, further wherein subtracting colors from the analyzed frame that are in the palette of the existing colors compares the colors in the analyzed frame against the palette of the existing colors based on the acceptable variations.

9. The computerized method of claim 8, wherein the acceptable variations differ between the colors in the palette of the existing colors based upon results of the analysis of the plurality of preliminary images.

10. The computerized method of claim 4, wherein the reference frame is shrunken to reduce a number of pixels and colors before identifying the colors in the reference frame.

11. The computerized method of claim 3, further comprising aging the potential shot by ensuring that the potential shot remains in a plurality of images taken over time before verifying the potential shot.

12. The computerized method of claim 11, wherein aging of the potential shot comprises:
   i) identifying relevant pixel locations in the filtered image map,
   ii) adding a first number to values in a heat map at the relevant pixel locations,
   iii) subtracting a second number having a lower magnitude than the first number from all locations in the heat map,
   iv) identifying hot locations in the heat map having value magnitudes that exceed a threshold magnitude,
   v) performing subsets i) to v) over the plurality of images, and
   vi) identifying only the hot locations as part of the potential shot.

13. The computerized method of claim 12, wherein identifying the relevant pixel locations in the filtered image map comprises converting the filtered image map to a binary representation and then using the binary representation to identify the relevant pixel locations.

14. A computerized method, comprising:
   a) receiving image frames of an area including a surface;
   b) initializing the surface by:
      i) receiving a preliminary image of the surface prior to any aberration appearance,
      ii) registering the surface in the preliminary image to align the surface to a preliminary image reference frame,
      iii) identifying colors in the preliminary image reference frame,
      iv) running the colors through a quantization algorithm to identify a limited set of colors, and
      v) storing the limited set of colors as a palette of existing colors;
   c) identifying a potential aberration in an analyzed frame by subtracting colors from a first image frame that are in the palette of existing colors so as to leave remaining colors;
   d) verifying the potential aberration as a verified aberration, and
   e) storing data concerning the verified aberration, including a location of the verified aberration relative to the surface and a timing for the verified aberration.

15. The computerized method of claim 14, further comprising:
   f) sending information indicative of the verified aberration to a mobile device for presentation on a user interface.

16. The computerized method of claim 14, wherein verifying the potential aberration is a verified aberration comprises comparing the potential aberration to known aberrations to determine whether the potential aberration is one of the known aberrations.

17. The computerized method of claim 14, wherein acceptable variations are stored along with each of the limited set of colors, further wherein subtracting colors from the analyzed frame that are in the palette of existing colors compares the colors in the analyzed frame against the palette of existing colors based on the acceptable variations.

18. A computerized method of target shot identifying in image data, comprising:
   a) receiving a plurality of images of an area including a target;
   b) registering the target in the plurality of images by identifying a perimeter and using a non-rigid transformation to align the target to reference frames;
   c) identifying a potential shot in the plurality of images;
   d) aging the potential shot by, for each image in the plurality of images:
      i) identifying pixel locations for the potential shot,
      ii) adding a first number to values in a heat map at the pixel locations,
      iii) subtracting a second number having a lower magnitude than the first number from all locations in the heat map,
      iv) identifying hot locations in the heat map having value magnitudes that exceed a threshold magnitude,
   e) identifying the hot locations as an aged target shot;
   f) verifying the aged target shot as a verified shot by comparing it to known shots; and
   g) storing data concerning the verified shot, including a location of the verified shot and a timing for the verified shot.

19. The computerized method of claim 18, further comprising removing background colors from each image to create a filtered image map, further comprising converting the filtered image map to a binary representation and then using the binary representation to identify the pixel locations.

20. The computerized method of claim 18, further comprising:
   h) sending information indicative of the verified shot to a mobile device for presentation on a user interface.

* * * * *